March 2, 1926.
G. HORVATH
INTERNAL COMBUSTION ENGINE
Filed May 31, 1921
1,574,971
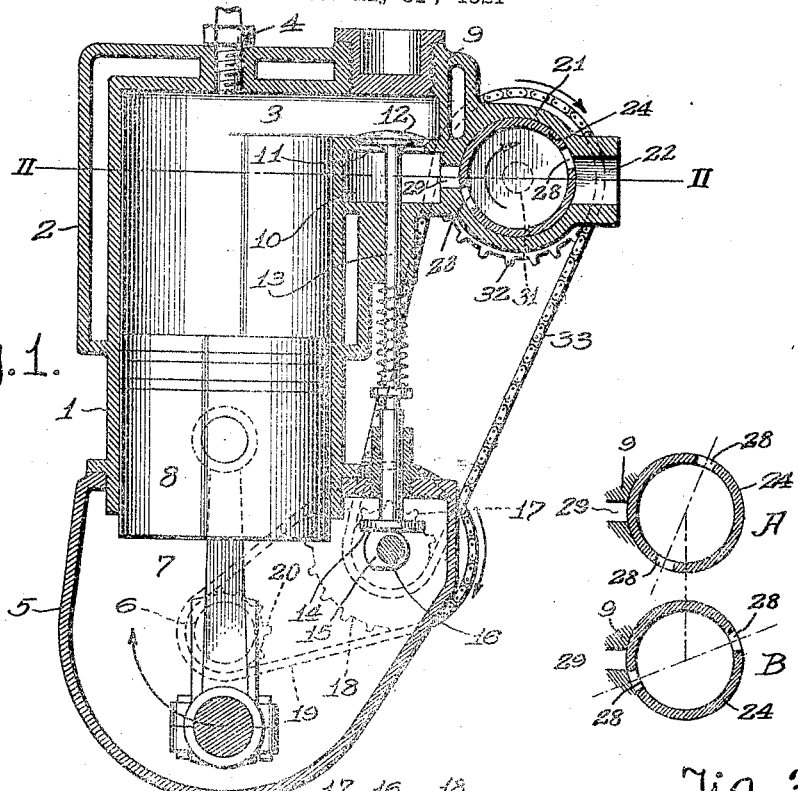
Fig.1.
Fig.3.
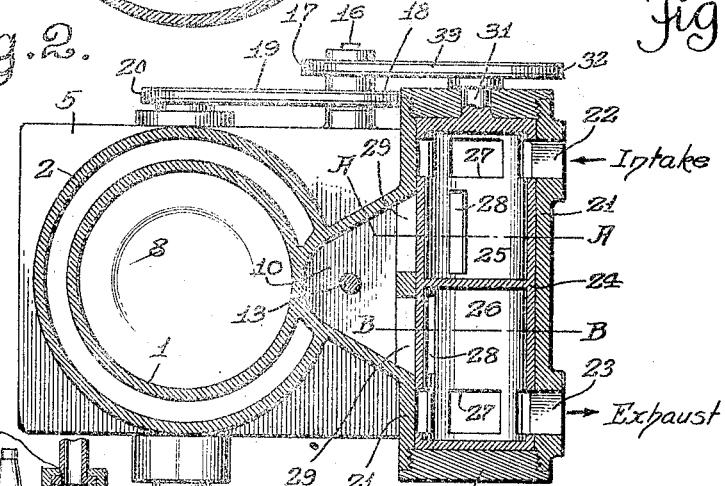
Fig.2.
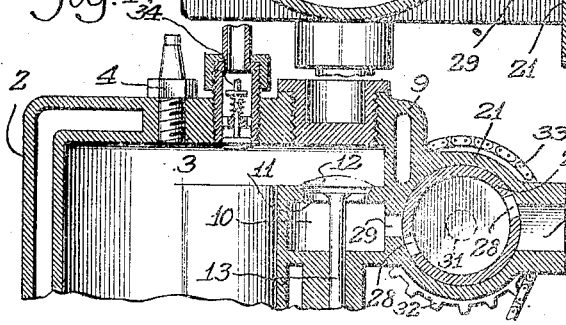
Fig.4.
Inventor
Geza Horvath
by
Attorneys Patented Mar. 2, 1926.

1,574,971

UNITED STATES PATENT OFFICE.

GEZA HORVATH, OF HIGHLAND PARK, MICHIGAN.

INTERNAL-COMBUSTION ENGINE.

Application filed May 31, 1921. Serial No. 473,795.

*To all whom it may concern:*

Be it known that I, GEZA HORVATH, a citizen of the United States of America, residing at Highland Park, in the county of Wayne and State of Michigan, have invented certain new and useful Improvements in Internal-Combustion Engines, of which the following is a specification, reference being had therein to the accompanying drawings.

Many types of internal combustion engines require two tappet valves for each cylinder, one valve serving for exhaust purposes and the other for intake purposes.
Such valves necessitate a large combustion chamber for a cylinder and even so the exhaust and intake openings controlled by the valves are comparatively small, consequently the intake of fuel and the exhaust of burned gases is somewhat restricted. Furthermore, the valves of such an engine are subjected to a great heat and even with water jackets about the valve seats, the valves become dangerously hot and are subjected to distortion and wear when in such condition.

The primary object of my invention is to provide an internal combustion engine with a single tappet valve in contradistinction to two valves, the single tappet valve serving for intake and exhaust purposes and permitting of a larger combustion chamber in connection with an engine cylinder, and an intake and exhaust opening of greater size than the usual intake and exhaust openings, consequently there will be greater freedom and ease of fuel entering the engine cylinder and burned gases exhausting therefrom. By using a single valve for intake and exhaust purposes, the valve will be alternately heated and cooled. The incoming fuel will cool the valve which has been previously heated during an explosion and during the exhaust of burned gases from the combustion cylinder, and by the incoming fuel cooling the valve the fuel absorbs some of the excessive heat and is placed in a better condition for ignition purposes within the cylinder of the engine.
Another object of my invention is to provide an internal combustion engine with a cylinder and valves controlling the admission of fuel to said cylinder and the exhaust of burned gases therefrom, the valves having a relation to each other and to said cylinder, which permits of one valve protecting the other during the ignition of fuel in the cylinder.

A further object of this invention is to furnish an internal combustion engine with a rotary chambered valve permitting fuel to enter the cylinder from one of the valve chambers and burned gases to exhaust from the cylinder to the other valve chamber, and associated with said rotary valve is a tappet valve operated in timed relation to the rotary valve and adapted to control the passage of fuel and burned gases to and from the cylinder of the engine.

A further object of this invention is to provide an internal combustion engine with an auxiliary chamber and valve, one of which admits fuel to the auxiliary chamber and the other of which controls the passage of fuel into the cylinder of the engine and causes the fuel to be heated by conduction and further vaporized.

A still further object of my invention is to furnish an internal combustion engine with a rotary valve and a tappet valve, the latter obviating the necessity of thoroughly packing the former.

A still further object of my invention is to provide an internal combustion engine wherein a pressure opened valve admits fuel, under pressure to the combustion chamber of a cylinder of the engine, a rotary valve admits air to the cylinder and permits burned gases to escape therefrom, and a tappet valve controls the admission of air to the cylinder and the exhaust of gases therefrom. These valves have a timed operation so that air will be admitted to the combustion chamber and cylinder in advance of the fuel, preferably during a portion of the intake stroke of the engine piston, and during the first half of the compression stroke of the piston fuel will be injected so that the air and fuel may commingle during the final half stroke of the engine piston.

The above are a few of the objects which may be obtained by combining valves in a manner to be hereinafter described and reference will now be had to the drawings, wherein.

Figure 1 is a vertical sectional view of an internal combustion engine in accordance with my invention;

Fig. 2 is a horizontal sectional view taken on the line II—II of Fig. 1;

Fig. 3 shows detail cross sectional views of the rotary valve engine, the views being taken on the lines A—A and B—B of Fig. 2, and Fig. 4 is a vertical, sectional view of a portion of an engine showing a three valve combination.

In the drawing, the reference numeral 1, denotes a cylinder having the upper portion thereof provided with a water jacket 2, a combustion chamber 3, and a spark plug 4.

5 denotes a crank case supporting the cylinder 1 and in the crank case is a crank shaft 6 provided with a connecting rod 7 suitably connected to a piston 8 reciprocable on the cylinder 1.

9 denotes an offset portion at the upper end of the cylinder 1 and said offset portion communicates with the combustion chamber 3 and has an auxiliary chamber 10 adapted to communicate with the combustion chamber 3 through a valve seat opening 11.

12 denotes a tappet valve normally closing the opening 11 and adapted to open into the combustion chamber 3, said tappet valve having a valve rod 13 extending downwardly into the crank case 5 where said rod has a tappet head normally engaging a cam 15.

16 denotes a cam shaft journaled in the crank case 5 and supporting the cam 15, said cam shaft having its outer end provided with sprocket wheels 17 and 18, the latter provided with a sprocket chain 19 which is trained over the sprocket wheels 20 on the crank shaft 6 so that said shaft may drive the cam shaft 16.

21 denotes a rotary valve body communicating with the auxiliary chamber 10 and having its axis disposed at a right angle to the axis of the cylinder 1, but to one side of said cylinder due to the interposed auxiliary chamber 10. The valve body 21 has an intake fuel passage 22 and a passage 23 for the exhaust or burned gases, these passages being located at the outer side of the valve body 21 and at opposite ends thereof. 24 denotes a rotary chambered valve in the valve body 21 and said rotary valve has independent end chambers 25 and 26. The walls of each chamber have a series of ports 27 adapted to communicate with the passages 22 and 23, and also ports 28 adapted to communicate with the auxiliary chamber 10 through ports or passages 29 establishing communication between the auxiliary chamber 10 and the valve chambers 25 and 26.

30 denotes suitable heads closing the ends of the valve body 21 and the rotary valve 24 has a stem 31 extending through one of said heads and provided with a large sprocket wheel 32 over which is trained a sprocket chain 33 which extends around the sprocket wheel 17, so that the cam shaft 16 may rotate the rotary valve 24.

The arrangement of the ports 27 and 28 of the valve chamber 25 is such that the auxiliary chamber 10 may be supplied with the fuel and then the auxiliary chamber 10 closed by the rotary valve 24 so that in the cycle of the engine, the auxiliary chamber 10 may eventually exhaust into the chamber 26. The valve 24 is rotated in timed rotation to the cam shaft 16 and since this shaft actuates the valve 12, said valve will control the passage of fuel into the combustion chamber 3 and the exhaust of burned gases therefrom, said tappet valve being operated in timed relation to the rotary valve. Since the tappet valve 12 closes the opening 11, during the ignition of fuel in the combustion chamber 3, it is obvious that the rotary valve 24 is protected by the tappet valve. Furthermore, since the tappet valve is exposed to an explosion in the combustion chamber 3, said valve will be heated, and any fuel contacting therewith will also be more or less heated and placed in a better condition for ignition purposes.

As shown in Fig. 4 the engine may have a fuel injector or spray valve 34 by which fuel, under pressure may be injected into the chamber 3 or the cylinder 1. In this instance the rotary valve supplies air, instead of fuel, and the three valve combination, 12, 24 and 34, is timed so that air will be admitted to the cylinder 1 in advance of the fuel, and the air and fuel will commingle on the compression stroke of the piston.

I desire to direct attention to the fact that the tappet valve constitutes means, constructively independent of the rotary valve, for protecting and sealing said valve relative to the engine cylinder, during an explosion, and consequently the rotary valve need not be as thoroughly packed as though opening or closing directly at the wall of an engine cylinder or the combustion chamber thereof. In lieu of the rotary valve, I may use a slide valve or valves of various types, I may also re-arrange the valves so as to be used in connection with various types of engine. In view of many contemplated changes I do not care to confine my invention other than defined in the appended claim.

What I claim is:—

In an internal combustion engine, a cylinder having a combustion chamber, an auxiliary chamber in a plane below the combustion chamber of said cylinder and having a passage to said combustion chamber, a tubular valve body of substantial length having intake and exhaust ports adjacent its ends and the ports from said auxiliary chamber intermediate its ends, all of said ports being in the same horizontal plane as said auxiliary chamber, and said auxiliary chamber having walls diverging from said passage towards said valve body so that the intermediate ports may both open into said chamber, and a pair of axially and integrally alined rotary valves in said valve body controlling the passage of fuel and burned gases to and from said auxiliary chamber through the ports of said valve body.

In testimony whereof I affix my signature.

GEZA HORVATH.